United States Patent [19]

Sponseller et al.

[11] 4,377,680

[45] Mar. 22, 1983

[54] CURING OF POLYGLYCIDYL ETHER RESINS

[75] Inventors: David R. Sponseller, North Chelmsford, Mass.; Earl G. Melby, Uniontown; Hubert J. Fabris, Akron, both of Ohio

[73] Assignee: The General Tire & Rubber Company, Akron, Ohio

[21] Appl. No.: 382,871

[22] Filed: May 28, 1982

[51] Int. Cl.$^3$ .............................................. C08G 59/44
[52] U.S. Cl. .................................... 528/123; 528/362; 260/465.2; 260/465.4
[58] Field of Search .............................. 528/123, 362; 260/465.2, 465.4

[56] References Cited

U.S. PATENT DOCUMENTS

| | | | |
|---|---|---|---|
| 3,465,006 | 7/1969 | Aelony | 528/123 |
| 3,467,707 | 9/1969 | Aelony | 528/123 |
| 4,202,920 | 5/1980 | Renner et al. | 528/362 |
| 4,263,162 | 4/1981 | Buysch et al. | 260/465.2 |

Primary Examiner—Lucille M. Phynes

[57] ABSTRACT

Cyanoethylated and/or cyanopropylated hydrazides are useful as curing agents for polyglycidyl ether resins. These hydrazide-epoxy resin mixtures have useful pot lives and exhibit fast cures.

28 Claims, No Drawings

CURING OF POLYGLYCIDYL ETHER RESINS

This invention relates to the curing of epoxide resins with certain hydrazide derivatives.

BACKGROUND OF THE INVENTION

Hydrazides and hydrazides of carboxylic acids have been used as latent curing agents for epoxy resins (Lee and Neville, "Handbook of Epoxy Resins," McGraw-Hill Book Company, New York, 1967; "Encyclopedia of Polymer Science And Technology," John Wiley & Sons, Inc., Vol. 6, 235 (1967); and U.S. Pat. Nos. 3,014,009; 3,102,043; 3,876,606 and 2,847,395) as well as intermediates in the preparation of a variety of fiber-forming polymers (Campbell et al. J. App. Pol. Sci. 2 (5), 155 (1959); and "Encyclopedia Of Polymer Science And Technology," Polyhydrazides, John Wiley & Sons, Inc., Vol. 11, 169-187 (1969)).

Compounds containing two or more hydrazide groups per molecule are high-melting materials which are only sparingly soluble in all but strongly H-bonding solvents. While their virtual insolubility in for example epoxy resins at ambient temperatures makes it possible to design one-component systems with extended storage stability, it also necessitates long curing times at relatively high temperatures (typically 30 to 60 minutes at 150° to 180° C.) (Lee and Neville, U.S. Pat. No. 3,014,009 and U.S. Pat. No. 2,847,395, above).

The addition of acrylates to mono and dihydrazides and the use of the addition products to cure epoxies (U.S. Pat. Nos. 4,061,845 and 4,101,602) as well as the cyanoethylation of benz- and acethydrazides (Ebnother et al, Helv. 42, 533 (1959)) and the preparation of acetic acid, 1-(2-cyanoethyl)-2-phenyl hydrazide have been reported in the literature ("The Chemistry of Acrylonitrile," 2nd Ed., American Cyanamid Co., New York, 1959, page 195). However, these latter references do not disclose the cyanoethylated products as curing agents for epoxides.

OBJECTS

An object of the present invention is to provide new methods of curing epoxy or epoxide resins of the glycidyl ether type using as curing agents novel derivatives of hydrazides.

Another object of this invention is to provide new hydrazide derivatives as curing agents for epoxy resins of the glycidyl ether type.

A further object of this invention is to provide glycidyl ether type epoxide resins cured with new derivatives of hydrazides.

These and other objects and advantages of the present invention will become more apparent to those skilled in the art from the following detailed description and working examples.

SUMMARY OF THE INVENTION

According to the present invention it has been found that cyanoethylated and/or cyanopropylated hydrazides are very useful curing or crosslinking agents for polyglycidyl ether resins. These epoxy-cyanoethylated and/or propylated hydrazide formulations are essentially two-component systems with extended room temperature pot life (4-5 days) and rapid gel times at elevated temperatures. During storage at room temperature, the viscosity of some of these mixtures may increase, but no cross-linked resin is formed even after storage times in excess of one month. The mixtures still flow if the temperature is raised to 80°-120° C. Above 120° C., the stored mixtures also gelled very fast (gel time < 1 minute). In some cases, brittle, glasslike resins are formed during storage, which can be powdered and may be useful in powder coating applications.

The increase in gel rate associated with the cyanoethylation and/or cyanopropylation of hydrazides is unexpected when compared with structurally similar cyanoethylated primary amines, e.g., NCCH$_2$CH$_2$NHCH$_2$CH$_2$NHCH$_2$CH$_2$CN, in which an actual slowing of the reaction occurs (18 minutes gel time at 150° C. vs. 0.5 minute for the unsubstituted amine). Furthermore, if another election withdrawing moiety, ethyl acrylate, is added to e.g. carbohydrazide, the obtained product, (CH$_3$CH$_2$OCOCH$_2$CH$_2$NHNH-)$_2$OO, gels epoxy resins of the glycidyl ether type at even slower rate than the unsubstituted carbohydrazide (18 minutes gel time at 150° C. vs. 8-12 minutes for the unsubstituted dihydrazide).

A further unique feature of the activity of cyanoethylated hydrazides is the ability to cure epoxy resins at relatively high mole ratios of epoxy/curing agent. Using dicyanoethylated carbohydrazide and the diglycidyl ether of bisphenol A (EPON 828) as model reactants, mixing ratio effects were studied at both 120° C. and 150° C. by following both the rate of gelation on a cure plate and the actual rate of reaction by measuring the disappearance of the epoxide absorption band at 915-920 cm$^{-1}$ in the infrared spectrum. Relatively fast reactions or gelation rates were observed with epoxy/NH ratios as high as 4/1 to 6/1. In contrast, neither unsubstituted hydrazides nor primary amines with up to 4 active hydrogens produced gel at epoxy/NH ratios greater than 2.

In general the cyanoethylated and/or cyanopropylated hydrazides are more soluble in the epoxides and give faster rates of cure and more completely cross-linked products at equivalent ratios of epoxide to NH as compared to other NH containing materials (unsubstituted hydrazides, reaction products of hydrazides and unsaturated esters, amines and cyanoethylated amines).

DISCUSSION OF DETAILS AND PREFERRED EMBODIMENTS

Preparation of hydrazides of acids can be obtained by the reaction of hydrazine hydrate and carboxylic acid esters in concentrated alcoholic solution (U.S. Pat. No. 2,847,395 and Fieser and Fieser, "Organic Chemistry," D. C. Heath And Company, Boston, 1944, page 184). Examples of hydrazides for use in the preparation of the cyanoethyl and cyanopropyl adducts of the present invention are carbohydrazide

oxalyl dihydrazide

isophthalic dihydrazide, trimethyladipic dihydrazide, sebacic acid dihydrazide, adipyl dihydrazide, azelayl dihydrazide, succinyl dihydrazide, malonyl dihydrazide, hexahydroterephthalyl dihydrazide and other hydrazides formed by reaction of hydrazine hydrate with esters of trimesic acid, cyclopentane tetracarboxylic acid and the like.

Still other esters may be used for reaction with hydrazine hydrate to make hydrazides. These esters may be dimers, trimers, oligomers, polymers and/or copolymers having a hydrocarbon backbone or moiety which has an average molecular weight of from about 250 to 5000 and from 2 to 10 ester groups and which may have a minor amount by weight of —C≡N groups. These esters may be obtained by polymerizing or copolymerizing one or more polymerizable ethylenically unsaturated ester monomers alone or with one or more other copolymerizable ethylenically unsaturated monomers. The ester monomers have 1 to 3 ester groups, from 1 to 2 ethylenically unsaturated double bonds and from 4 to 35 carbon atoms. Examples of such esters are methyl acrylate, ethyl acrylate, butyl acrylate, 2-ethyl hexyl acrylate, methyl methacrylate, n-butyl methacrylate, isopropyl methacrylate, cyclohexyl methacrylate, neopentyl methacrylate, dimethyl fumarate, di-n-butyl fumarate, di-n-amyl fumarate, diethyl maleate, diisobutyl maleate, di-n-amyl maleate, dimethyl itaconate, diethyl itaconate, methyl cinnamate, ethyl cinnamate, methyl sorbate, ethyl sorbate, dimethyl citraconate, diethyl citraconate, methyl crotonate, ethyl crotonate, dimethyl mesaconate, diethyl mesaconate, triethyl aconitate, trimethyl aconitate, tripropyl aconitate and the like and mixtures thereof. The other ethylenically unsaturated monomers or monomers which can be copolymerized with one or more of the foregoing polymerizable ester monomers include those having from 2 to 10 carbon atoms such as the dienes like butadiene-1,3, isoprene, 2,3-dimethyl butadiene-1,3 and piperylene; the vinyl benzenes like styrene, vinyl toluene, methyl vinyl toluene and alpha-methyl styrene; the nitriles like acrylonitrile and methacrylonitrile; the alpha olefins like ethylene, propylene and butylene and the like and mixtures thereof. The presence of diene units in the resulting hydrazide or cyanoethylated or propylated hydrazide may afford impact resistance to the resulting cured epoxide. A minor amount by weight of copolymerized acrylonitrile or methacrylonitrile in the ester and finally in the hydrazide may afford more compatibility with the epoxide. These esters preferably are polymerized by free radical aqueous emulsion procedures using free radical catalysts, modifiers, emulsifiers, surfactants, water and free radical catalysts or initiators like peroxides, persulfates, and compounds like 2,2'-azobisisobutyronitrile, stabilizers, chelating agents, shortstops and so forth. Free radical catalysis is well known as shown by "Encyclopedia Of Polymer Science And Technology," Interscience Publishers a division of John Wiley & Sons, Inc., New York, Vol. 3 (1965), Vol. 7 (1967), Vol. 9 (1968) and Vol. 11 (1969); "Vinyl and Related Polymers," Schildhnecht, John Wiley & Sons, Inc., New York, 1952 and "Synthetic Rubber," Whitby et al, John Wiley & Sons, Inc., New York, 1954. Anionic polymerization, also, may be used as shown by U.S. Pat. No. 4,302,568. After polymerization the living polymer may be treated with water, methanol or ethanol to remove the active group and replace it with a proton. After dimerization, polymerization and so forth the resulting polyesters should be recovered and freed of catalyst or catalyst residues, shortstops and so forth and resuspended in water, solvent or other media for future reaction with the hydrazine hydrate. The resulting dimeric, trimeric, polymeric esters and so forth should be free of carbonyl or ester groups in the backbone and further should be free of halogen.

Thus, the hydrazides for reaction with acrylonitrile and/or methacrylonitrile, have the formula

NH$_2$NHCNHNH$_2$,  (1)

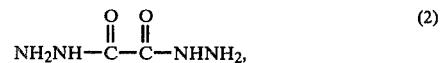

NH$_2$NH—C—C—NHNH$_2$,  (2)

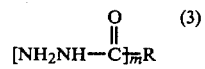

[NH$_2$NH—C$\frac{}{}_m$R  (3)

where R is a hydrocarbon radical having from 1 to 30 carbon atoms and where m is a number from 2 to 6 and

[NH$_2$NHC$\frac{}{}_n$R'  (4)

where R' is a hydrocarbon moiety selected from the group consisting of dimers, trimers, oligomers, polymers and copolymers having an average molecular weight of from about 250 to 5000 and which may contain a minor amount by weight of —C≡N groups and where n is a number from 2 to 10. Mixtures of these hydrazide compounds may be used.

The acrylonitrile, methacrylonitrile or mixture thereof may be reacted in water or water-alcohol mixture with the acid hydrazide in a suitable reactor, enclosed to prevent fumes of the nitriles from escaping, at temperatures of from about 20° C. up to the reflux temperature (usually about 100° C.) of the mixture for a time sufficient to insure reaction. If sufficient times and temperatures are not utilized and if an insufficient amount of the nitrile is employed, all of the —NH—NH$_2$ groups will not have been reacted to form di or higher cyanoethylated and/or propylated hydrazide. However, at least a predominating amount of the hydrazide groups should be cyanoethylated and/or cyanopropylated using proper amounts of the nitriles and adequate times and temperatures to afford a product which is effective for curing the epoxides. Preferably all of the hydrazide groups should be cyanoethylated and/or cyanopropylated by using an excess molar amount of the nitrile as compared to the hydrazide. Reaction may be conducted under inert conditions such as by using an inert atmosphere of nitrogen, helium, argon, neon and so forth. Cooling means may be provided to control the reaction. After the end of the reaction the reaction mixture should be filtered or stripped of non reactants and suitably purified if required.

The resulting acrylonitrile and/or methacrylonitrile reacted, cyanoethylated and/or cyanopropylated, hydrazides have the following formulae:

NCCR"HCH$_2$NHNHCNHNHCH$_2$CHR"CN,  (1a)

NCCR"HCH$_2$NHHNC—CNHNHCH$_2$CHR"CN,  (2a)

-continued

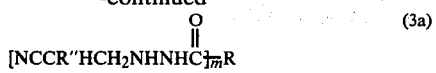  (3a)

where R is a hydrocarbon radical of from 1 to 30 carbon atoms and where m is a number from 2 to 6 and

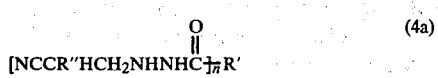  (4a)

where R' is a hydrocarbon moiety selected from the group consisting of dimers, trimers, oligomers, polymers and copolymers having an average molecular weight of from about 250 to 5000 and which may contain a minor amount by weight of —C≡N groups and where n is a number from 2 to 10 and where R'' is hydrogen or methyl. Mixtures of these cyanoethylated and/or cyanopropylated hydrazides may be used for curing the epoxides.

Also, there may be used as curing agents for the epoxides mixtures of the cyanoethylated and/or cyanopropylated hydrazides and up to about 30 mol % by weight thereof of the same or similar above unreacted hydrazides.

The epoxide resins used in the practice of the present invention can be any of the well known polyglycidyl ether resins, e.g., those made from epichlorohydin, having an average of at least two glycidyl ether,

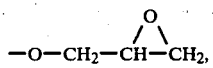

groups. Examples of such resins are bisphenol A epoxide (preferred), brominated bisphenol A epoxides like tetrabromo bisphenol A, phenolic novolak epoxides, tetra phenylolethane epoxides, tetra glycidyl ether of p,p'-methylene dianiline, diglycidyl ether of pentaerythritol, triglycidyl ether of phloroglucinol, diglycidyl ether of resorcinol, triglycidylether of trihydroxybiphenyl, tetraglycidyl ether of bisresorcinol, tetraglycidyl ether of bisresorcinol B, diglycidyl ether of 1,4-butanediol, triglycidyl ether of glycerol and so forth. Any one of these epoxide resins may be pure or a mixture of the type involved. Mixtures of epoxide resins may be used. They may be made from aliphatic, aromatic or aliphatic-aromatic compounds. They may be liquid or meltable solids. These epoxide resins preferably have an epoxide equivalent of from about 130 to 6,000 and an average molecular weight of from about 300 to 12,000. Some of the commercial resins may be supplied in reactive diluents or in solvents.

For more information on polyglycidyl ether resins see "Epoxy Resins," Lee and Neville, McGraw-Hill Book Company, Inc., New York, 1957; "Epoxy Resins," Advances In Chemistry Series 92, American Chemical Society, Washington, 1970; "Handbook Of Epoxy Resins," Lee and Neville, McGraw-Hill Book Company, New York, 1967; "Epoxy Resin Technology," Bruins, Interscience Publishers, a division of John Wiley & Sons, New York, 1968; "Modern Plastics Encyclopedia," 1980–81, October, 1980, Volume 57, Number 10A, McGraw-Hill, Inc., New York, pages 28 to 30 and "Encyclopedia Of Polymer Science And Technology," Vol. 6, 1967, John Wiley & Sons, Inc., pages 209 to 271.

Epoxy reactive diluents, monoglycidyl ethers, such as butyl glycidyl ether, phenyl glycidyl ether, 4-methyl phenyl glycidyl ether, 4-butyl phenyl glycidyl ether, dodecyl glycidyl ether, 2-ethyl hexyl glycidyl ether and the like may be mixed with the polyglycidylether resins to act as internal plasticizers. They, also, may serve to reduce viscosity and cross-link density. These monomeric epoxides may be used additionally in an amount of up to about 10 mol % based on the moles of the polyglycidyl ether used. The monomeric glycidyl ethers have from 6 to 18 carbon atoms inclusive of the glycidyl ether group. Mixtures of these monomeric glycidyl ethers may be used.

The cyanoethylated and/or cyanopropylated hydrazides may be mixed with the epoxide and heated at from about 100° to 165° C., preferably from about 120° to 150° C., for a period of time sufficient to cure or cross-link the epoxide. The epoxy resin and the cyanoethylated and/or cyanopropylated hydrazide are used in an equivalent ratio of epoxy

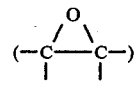

of the epoxide to amine (—NH—) of the hydrazide of from about 1:1 to 12:1, preferably from about 1:1 to 6:1.

The compositions of the present invention may suitably be compounded with pigments, dyes, stabilizers, antioxidants or other antidegradants, fire or flame retardants, lubricants, delustering agents, fillers (fibrous or finely divided), reinforcing agents and other plastics and rubbers and so forth.

The compositions of the present invention may be used as adhesives for bonding together FRP's (glass fiber reinforced plastics, e.g., thermoset unsaturated polyester, styrene, and glass fiber composites), FRP's to metal such as steel and so forth. These compositions, also, may be used in the manufacture of flooring and of filament wound articles and as coatings and encapsulants for electrical motors and transformers. Moreover, the compositions of the present invention may be used in the manufacture of thermoset FRP's (glass fiber reinforced epoxide composites). In general, these compositions may be used as decorative and protective coatings for metal, glass, wood, plastics, fabrics and the like and as adhesives for metal, glass, wood, fabrics, plastics and the like.

The following examples will serve to illustrate the present invention with more particularity to those skilled in the art. In the examples, parts are parts by weight unless otherwise noted.

EXAMPLE 1

Carbohydrazide (9.0 g, 0.1 mole) and acrylonitrile (5.3 g, 0.1 mole) were mixed with deionized water (25.0 g) and allowed to react overnight at ambient temperatures. The mixture was then refluxed for 1 hour. The volatiles were stripped off under vacuum at 100° C. over a 4-hour period of time. The yield was 14.2 g of a mixture of cyanoethylated carbohydrazides. Thin layer chromatography showed the product to be a mixture of unsubstituted carbohydrazide, dicyanoethyl carbohydrazide and monocyanoethyl hydrazide.

EXAMPLE 2

Carbohydrazide (90.1 g, 1 mole) was mixed with acrylonitrile (135 g, 2.5 mole) in 500 ml water. This mixture was stirred at 50°–60° C. for 3 hours. The volatiles were removed at 60° C. and 0.5 mm Hg. A honey colored viscous liquid resulted. The viscous liquid was dissolved in 500 ml methanol and chilled to 5° C. A white crystalline mass resulted which was filtered to remove methanol. The resultant white product was dried in a vacuum oven. Using thin layer chromatography and NMR (Nuclear Magnetic Resonance), this product was shown to be pure dicyanoethyl carbohydrazide, m.p. 77°–78° C.

EXAMPLE 3

Isophthalic dihydrazide (19.4 g, 0.1 mole), acrylonitrile (10.6 g, 0.2 mole) and 70 ml of deionized water were mixed and refluxed for 4 hours. The reflux temperature rose slowly from 77° C. to 95° C. The volatiles were removed using high vaccum. An opaque solid resulted (>95% yield). Recrystallization of this product from ethanol resulted in pure dicyanoethyl-isophthalic dihydrazide (m.p. 147°–149° C.), as shown by thin layer chromatography and NMR.

EXAMPLE 4

Trimethyladipic dihydrazide (54 g, 0.25 mole) and acrylonitrile (28 g, 0.53 mole) were mixed with 100 ml of deionized water and 100 ml of ethanol. The mixture was refluxed overnight (18 hours). The volatiles were removed under vacuum at 80° C. A transparent yellow semisolid (80 g) was obtained. This product was dissolved in chloroform and precipitated with cold petroleum ether. A white powder was obtained which melted around 90°–110° C. By NMR and thin layer chromatography, this product was shown to be a mixture of monocyanoethyl-trimethyladipic dihydrazide (24%) and dicyanoethyl-trimethyladipic dihydrazide (76%).

EXAMPLE 5

Biscyanoethyl carbohydrazide (BCECH) and EPON 828 were mixed together in five different equivalent ratios in separate aluminum dishes. BOECH was assumed to have two equivalents of reactive NH group/mole. A small amount of the turbid looking material was placed on a cure plate which was preheated to 149° C. (300° F.). A small spatula was used to stir the hot mixture until gel formed. The time on the cure plate, from the moment the material was introduced until gel formed, is called the gel time and was measured with a stopwatch. The pot life at room temperature (i.e. the time after which the material became too viscous to handle) was also determined.

| Bis-cyanoethyl Carbohydrazide | EPON 828 | Gel Time (Minutes) | Pot Life (Days) |
| --- | --- | --- | --- |
| 1.68 g (.017 eq) | 3.7 g (.020 eq) | 2.1 | 6 |
| 1.57 g (.016 eq) | 6.0 g (.032 eq) | 4.17 | 6 |
| .78 g (.0080 eq) | 6.0 g (.032 eq) | 5.75 | 6 |
| .52 g (.0053 eq) | 6.0 g (.032 eq) | 18 | 6 |
| .39 g (.0040 eq) | 6.0 g (.032 eq) | >60 | 6 |

EPON 828 is a liquid bisphenol A-epichlorohydrin resin (diglycidyl ether of bisphenol A) having an epoxide equivalent of 185–192 (grams of resin containing one gram-equivalent of epoxide), a viscosity in poises at 25° C. of 100–160 and a color (Gardner) at 25° C. of 4 max. Shell Chemical Co.

EXAMPLE 6

Biscyanoetyl carbohydrazide and EPON 828 were mixed in three different equivalent ratios in separate aluminum dishes. These mixtures were allowed to stand at ambient temperatures for several days. The viscosity of the mixtures gradually increased until a solid was obtained after 10 days. After 12 days, the solids were powdered and placed on the cure plate at 150° C. The materials readily melted. The gel times were determined as in Example 5.

| Biscyanoethyl Carbohydrazide | EPON 828 | Gel Time (Minutes) |
| --- | --- | --- |
| 1.57 g (.016 eq) | 6.0 g (.032 eq) | .83 |
| .78 g (.0080 eq) | 6.0 g (.032 eq) | 1.0 |
| .52 g (.0053 eq) | 6.0 g (.032 eq) | .83 |

EXAMPLE 7

The reaction product from Example 1 and EPON 828 were mixed together in the proportions given in the table below. The gel time was determined using the same techniques as in Example 5.

| Reaction Product of Example 1 | EPON 828 | Gel Time (Minutes) |
| --- | --- | --- |
| .48 g (.01 eq)* | 1.85 g (.01 eq) | 3.3 |
| .48 g (.01 eq) | 3.70 g (.02 eq) | 3.6 |
| .48 g (.01 eq) | 7.40 g (.04 eq) | 11.5 |

*The average equivalent weight of the mixture is taken as equal to: $H_2NHNCONHNHCH_2CH_2CN/3$ (45.6)

EXAMPLE 8

Finely powdered carbohydrazide was dispersed in EPON 828 at two different weight ratios. The gel times were determined at 150° C. as described in Example 5.

| Carbohydrazide | EPON 828 | Gel Times (Minutes) |
| --- | --- | --- |
| 1.10 g (.049 eq) | 9.3 g (.049 eq) | 7.5–8.5 |
| .55 g (.024 eq) | 9.3 g (.049 eq) | 90 |

EXAMPLE 9

Carbohydrazide, 18 g (0.40 eq), was mixed with ethyl acrylate, 40 g (0.40 eq), in a solution of ethanol (100 ml) and deionized water (50 ml). This mixture was refluxed overnight. The volatiles were removed using vacuum at 80° C. A light-yellow, clear oil resulted. This material was shown to be a mixture of mono-, di- and trisubstituted addition products of ethyl acrylate and carbohydrazide by thin layer chromatography.

EXAMPLE 10

The reaction product of Example 9 and EPON 828 were mixed together in aluminum dishes in two proportions. Small amounts of the heterogeneous mixtures were applied to the cure plate as in Example 5 and the gel times determined.

| Reaction Product* of Example 9 | EPON 828 | Gel Time** (Minutes) |
|---|---|---|
| 2.30 g (.016 eq) | 3 g (.016 eq) | 18 |
| 1.15 g (.0080 eq) | 3 g (.016 eq) | >60 |

*The average equivalent weight of the mixture is taken as equal to ½ of the molecular weight of $(CH_3CH_2OCOCH_2CH_2NHNH)_2CO$ or (145 g/eq).
**In both cases a rubbery semisolid is obtained, which indicates incomplete network formation.

EXAMPLE 11

Ethylenediamine and EPON 828 were mixed in various amine:epoxide equivalent ratios. The gel time at 150° C. of the homogeneous mixtures was determined as in Example 5.

| Ethylenediamine | EPON 828 | Gel Time |
|---|---|---|
| .375 g (.025 eq) | 4.65 g (.025 eq) | 31 sec. |
| .190 g (.00125 eq) | 4.65 g (.025 eq) | 25 min.* |
| .100 g ($6.25 \times 10^{-4}$ eq) | 4.65 g (.025 eq) | >60 min.* |

*A rubbery semisolid is obtained, which indicates incomplete network formation.

EXAMPLE 12

N,N'-dimethylethylenediamine and EPON 828 were mixed together in varying proportions. A small portion of each mixture was applied to the cure plate at 149° C. (300° F.) and the gel time determined. The pot lives at ambient temperature were also determined. The data obtained are listed in the following table.

| N,N'—Dimethyl-ethylenediamine | EPON 828 | Gel Time (Minutes) | Pot Life |
|---|---|---|---|
| .88 g (.20 eq) | 3.7 g (.20 eq) | 14.5 | 22.5 min. |
| .44 g (.10 eq) | 3.7 g (.20 eq) | 24.0 | 45.0 min. |
| .22 g (.05 eq) | 3.7 g (.20 eq) | 60.0 | 2.25 hrs. |

EXAMPLE 13

N,N,N',N'-tetramethylbutanediamine and EPON 828 were mixed together in two different weight ratios to study the catalysis of epoxy resin polymerization by tertiary amines. A small portion of the homogeneous mixture was applied to the cure plate at 149° C.; the gel time and pot life were measured as in Example 5. The results are itemized in the following table.

| N,N,N',N'—Tetramethyl-butanediamine | EPON 828 | Gel Time (Minutes) | Pot Life (Hours) |
|---|---|---|---|
| .8 g (.0056 m) | 3.7 g (.019 eq) | 5 | 4 |
| .4 g (.0028 m) | 3.7 g (.019 eq) | 6 | 4–5 |

EXAMPLE 14

Tetraethylenepentamine and EPON 828 in various stoichiometric ratios were mixed together. The gel time and pot life were determined as in Example 5. The purpose of this series was to study gel effects using an amine with a high functionality (f=7). The data are shown below.

| Tetraethylenepentamine | EPON 828 | Gel Time | Pot Life |
|---|---|---|---|
| 2.50 g (.092 eq) | 18.5 g (.1 eq) | 28 sec. | 70 min. |
| 1.25 g (.046 eq) | 18.5 g (.1 eq) | 1.1 min. | 4 hr. |
| .63 g (.023 eq) | 18.5 g (.1 eq) | 4 hr. | 3 days |

EXAMPLE 15

Cyanoethylated trimethyladipic dihydrazide (the reaction product of Example 4) was mixed with EPON 828 in varying proportions. The gel time on a 150° C. cure plate was determined as in Example 5.

| Reaction Product* of Example 4 | EPON 828 | Gel Time (Minutes) |
|---|---|---|
| 2.58 g (.016 eq) | 6 g (.032 eq) | 12 |
| 1.29 g (.0080 eq) | 6 g (.032 eq) | 20 |
| .85 g (.0053 eq) | 6 g (.032 eq) | 52 |
| .64 g (.0040 eq) | 6 g (.032 eq) | >60 |

*The equivalent weight was calculated as equal to ½ the molecular weight of biscyanoethyl trimethyladipic dihydrazide.

EXAMPLE 16

Isophthalic dihydrazide (0.49 g, 0.010 eq) and EPON 828 (1.85 g, 0.010 eq) were mixed. The gel time, determined at 150° C. as in Example 5, was 50 minutes.

EXAMPLE 17

Biscyanoethylated isophthalic dihydrazide (BCEID) and EPON 828 were mixed in the proportions listed in the table below. The gel time on a 149° C. (300° F.) cure plate was determined as in Example 5.

| BCEID | EPON 828 | Gel Time (Minutes) |
|---|---|---|
| 1.50 g (.010 eq) | 1.85 g (.010 eq) | 3 |
| .75 g (.0050 eq) | 1.85 g (.010 eq) | 12.75 |
| .38 g (.0025 eq) | 1.85 g (.010 eq) | 23 |
| .25 g (.0017 eq) | 1.85 g (.010 eq) | 30 |
| .19 g (.00085 eq) | 1.85 g (.010 eq) | >60 |

EXAMPLE 18

Biscyanoethylated carbohydrazide (1 g) and EPON 828 (2 g) were mixed in an aluminum dish. The gel time was 7 minutes on a 120° C. cure plate. The mixture was applied to NaCl crystals and the infrared spectra were immediately determined using a Perkin-Elmer grating infrared spectrophotometer, model 237. After 20 minutes reaction time at 120° C., the epoxide absorption at 910 cm$^{-1}$ had completely disappeared.

EXAMPLE 19

Biscyanoethylated carbohydrazide (BCEC) and DER 661 were mixed in the following proportions. The gel times were determined on a 149° C. cure plate using the method described in Example 5.

| BCEC | D.E.R. 661 | Gel Time (Minutes) |
|---|---|---|
| .98 g (.010 eq) | 5.25 g (.010 eq) | 3.72 |
| .98 g (.010 eq) | 10.50 g (.020 eq) | 3.88 |

D.E.R. 661 is a low melting bisphenol A-epichlorohydrin (diglycidylether of bisphenol A) resin having an epoxy equivalent of 475–575 and a Durrans m.p. of 70°–80° C. Dow Chemical Co.

EXAMPLE 20

Biscyanoethylated carbohydrazide (BCEC) and EPON 828 were thoroughly mixed together at varying equivalent ratios and used to fabricate cross-pull adhesion specimens at each condition from gel coated sheet molding compound (SMC, polyester-styrene-glass fiber thermoset composite) strips 1×3×0.1 inches. These samples were cured 30 minutes at 150° C. in a forced air oven. After cooling to ambient conditions, the samples were torn apart in a cross-pull tester. The results are listed in the following table.

| EPON 828, parts | 3.70 | 7.40 | 14.80 | 29.48 |
|---|---|---|---|---|
| BCEC, parts | 1.68 | 1.68 | 1.68 | 1.68 |
| Equivalent Ratio (Epoxy/NH) | 1 | 2 | 4 | 8 |
| Cross-Pull Adhesion (MPa/PSI) | .49/71 | 1.17/170 | 1.32/191 | (no cure within 1 hour.) |
| Failure Mode (%) | | | | |
| Cohesive (Adhesive) | 50 | — | — | — |
| Adhesive | 50 | — | — | — |
| Cohesive (Substrate) | — | 100 | 100 | — |

EXAMPLE 21

This example illustrates the technique used to prepare all specimens for physical property testing. EPON 828 (90 g, 0.48 eq) was mixed with biscyanoethyl-trimethyladipic dihydrazide (19.35 g, 0.12 eq) at 110° C. The mixture was degassed under vacuum and poured into a vertical cavity mold (open head) at 125° C. The mixture was cured without pressure at 125° C. for 1 hour and then at 150° C. for 3 hours. A clear casting (6×6×0.08 inches) was obtained which was used for physical property testing.

EXAMPLE 22

Several specimens for physical testing were made from varying compositions using the procedure in Example 21. The physical properties of these specimens are listed in the following table.

| Material | eq. Epoxide eq. NH | Cure (min. at 150° C.) | FM (3) MPa × 10⁻³ | E (%) (4) | Tg (°C.) (5) |
|---|---|---|---|---|---|
| TMADH (1) | 1:1 | 30 | 3.40 | 5 | 144 |
| " | 2:1 | 60 | Brittle | — | 57 |
| DCETMADH (2) | 1:1 | 30 | 4.45 | 3 | 99 |
| " | 2:1 | 30 | 3.85 | 4 | 125 |
| " | 4:1 | 30 | 3.00 | 4 | 119 |

(1) Trimethyl adipic dihydrazide.
(2) Biscyanoethyl trimethyl adipic dihydrazide.
(3) Flexural modulus.
(4) Elongation.
(5) Glass transition temperature of final product.

We claim:

1. The method which comprises reacting in aqueous media at least a sufficient amount of at least one nitrile selected from the group consisting of acrylonitrile and methacrylonitrile with at least one hydrazide selected from the group consisting of

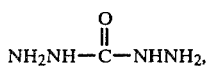
(1)

(2)

(3)

where R is a hydrocarbon radical having from 1 to 30 carbon atoms and where m is a number from 2 to 6 and

(4)

where R' is a hydrocarbon moiety selected from the group consisting of dimers, trimers, oligomers, polymers and copolymers having an average molecular weight of from about 250 to 5000 and which may contain a minor amount by weight of —C≡N groups and where n is a number from 2 to 10, at a temperature of from about 20° to 100° C. and for a period of time to form at least one compound selected from the group consisting of

(1a)

(2a)

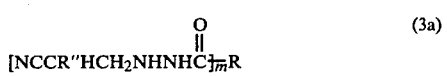
(3a)

where R is a hydrocarbon radical having from 1 to 30 carbon atoms and where m is a number from 2 to 6 and

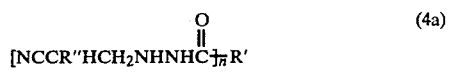
(4a)

where R' is a hydrocarbon moiety selected from the group consisting of dimers, trimers, oligomers, polymers and copolymers having an average molecular weight of from 250 to 5000 and which may contain a minor amount by weight of —C≡N groups and where n is a number from 2 to 10 and and where R" is hydrogen or methyl.

2. The method according to claim 1 where the nitrile is acrylonitrile.

3. The method according to claim 2 where the hydrazide is carbohydrazide.

4. The method according to claim 2 where the hydrazide is isophthalic dihydrazide.

5. The method according to claim 2 where the hydrazide is trimethyladipic dihydrazide.

6. A compound selected from the group consisting of

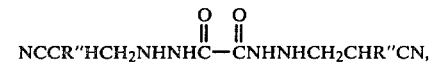

-continued

where R is a hydrocarbon radical of from 1 to 30 carbon atoms and where m is a number from 2 to 6 and

where R' is a hydrocarbon moiety selected from the group consisting of dimers, trimers, oligomers, polymers and copolymers having an average molecular weight of from about 250 to 5000 and which may contain a minor amount by weight of —C≡N groups and where n is a number from 2 to 10 and where R" is hydrogen or methyl and mixtures of such compounds.

7. A compound according to claim 6 where R" is hydrogen and m is 2.
8. A compound according to claim 7 where R is an alkylene radical of 7 carbon atoms and m is 2.
9. A compound according to claim 7 where R is an arylene radical of 6 carbon atoms and m is 2.
10. Biscyanoethyl carbohydrazide.
11. A curable composition comprising
(I.) at least one polyglycidyl ether resin having an average of at least two glycidyl ether groups, an epoxide equivalent of from about 130 to 6000 and a molecular weight of from about 300 to 12,000 and
(II.) at least one hydrazide compound selected from group consisting of

where R is a hydrocarbon radical of from 1 to 30 carbon atoms and where m is a number from 2 to 6 and

where R' is a hydrocarbon moiety selected from the group consisting of dimers, trimers, oligomers, polymers and copolymers having an average molecular weight of from about 250 to 5000 and which may contain a minor amount by weight of —C≡N groups and where n is a number from 2 to 10 and where R" is hydrogen or methyl, the equivalent ratio of epoxy

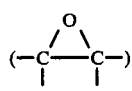

of (I.) to amine (—NH—) of (II.) being from about 1:1 to 12:1, or from about 1:1 to 6:1.

12. A curable composition according to claim 11 where (I.) is a diglycidyl ether-bisphenol A resin, where R" is hydrogen and m is 2.
13. A curable composition according to claim 12 where said hydrazide is dicyanoethyl-trimethyl adipic dihydrazide.
14. A curable composition according to claim 12 where said hydrazide is dicyanoethyl-isophthalic dihydrazide.
15. A curable composition according to claim 12 where said hydrazide is biscyanoethyl carbohydrazide.
16. A curable composition according to claim 11 where said composition additionally contains at least one monomeric glycidyl ether having from 6 to 18 carbon atoms in amount of up to about 10 mol % by weight of said polyglycidyl ether resin (I.).
17. The method which comprises mixing and heating at a temperature of from about 100° to 165° C., or from about 120° 150° C., for a period of time sufficient to cause curing of
(I.) at least one polyglycidyl ether resin having an average of at least two glycidyl ether groups, an epoxide equivalent of from about 130 to 6000 and a molecular weight of from about 300 to 12,000 and
(II.) at least one hydrazide compound selected from group consisting of

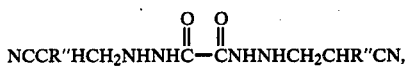

where R is a hydrocarbon radical of from 1 to 30 carbon atoms and where m is a number from 2 to 6 and

where R' is a hydrocarbon moiety selected from the group consisting of dimers, trimers, oligomers, polymers and copolymers having an average molecular weight of from about 250 to 5000 and which may contain a minor amount by weight of —C≡N groups and where n is a number from 2 to 10 and where R" is hydrogen or methyl, the equivalent ratio of epoxy

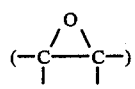

of (I.) to amine (—NH—) of (II.) being about 1:1 to 12:1, or from about 1:1 to 6:1.

18. The method according to claim 17 where (I.) is a diglycidyl ether-bisphenol A resin, where R" is hydrogen and m is 2.
19. The method according to claim 18 where said hydrazide is dicyanoethyl-trimethyladipic dihydrazide.

20. The method according to claim 18 where said hydrazide is dicyanoethyl isophthalic dihydrazide.

21. The method according to claim 18 where said hydrazide is biscyanoethyl carbohydrazide.

22. The method according to claim 17 where the mixture additionally contains at least one monomeric glycidyl ether having from 6 to 18 carbon atoms in an amount of up to about 10 mol % by weight of said polyglycidyl ether resin (I.).

23. The product produced by the method of claim 17.
24. The product produced by the method of claim 18.
25. The product produced by the method of claim 19.
26. The product produced by the method of claim 20.
27. The product produced by the method of claim 21.
28. The product produced by the method of claim 22.

* * * * *

UNITED STATES PATENT AND TRADEMARK OFFICE
CERTIFICATE OF CORRECTION

PATENT NO. : 4,377,680
DATED : March 22, 1983
INVENTOR(S) : David R. Sponseller et al It is certified that error appears in the above–identified patent and that said Letters Patent are hereby corrected as shown below:

In the claims, col. 14, line 21, after 120° insert ---to---.

Signed and Sealed this

Seventeenth Day of May 1983

[SEAL]

Attest:

DONALD J. QUIGG

Attesting Officer  Acting Commissioner of Patents and Trademarks